9253X
A. Hickman,
Riding Saddle.
Patented Nov. 23, 1835.
Side View.
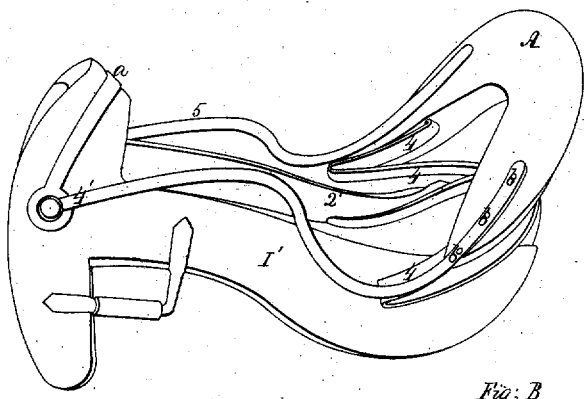
Fig; A
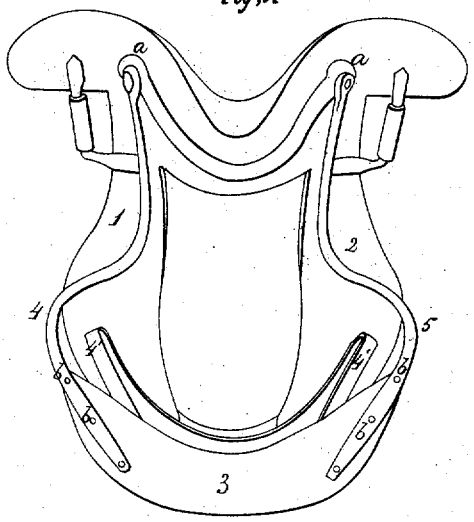
Fig; B
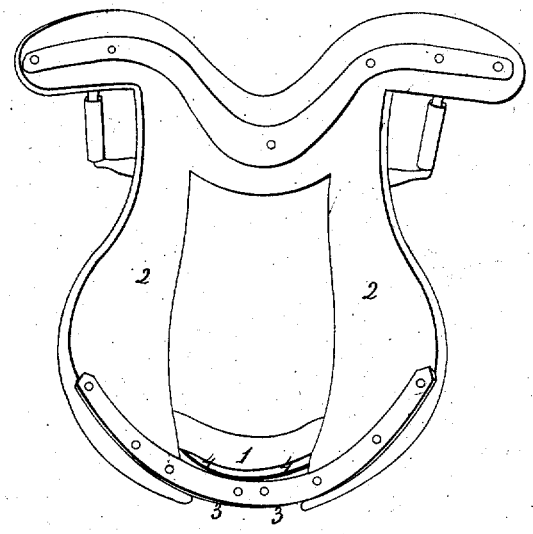
N. PETERS. PHOTO-LITHOGRAPHER, WASHINGTON, D. C.

Nov 23,1835 Nov. 23, 1835 373.

Adam Hickman
Letters Patent 9253X

The Schedule referred to in these Letters Patent and making part of the same containing a description in the words of the said Adam Hickman himself of his improvement in the spring saddle

---

To all to whom these presents shall come. Be it known that I Adam Hickman of the town of Abington in the County of Washington and State of Virginia a citizen of the United States have invented a new and useful improvement in the construction of the saddle tree and that the description hereto annexed and marked A. B. & C. is an exact description thereof as will be seen by the model of a saddle tree with my improvement which accompanies this description. What I claim as my invention and not previously known in the above described saddle tree is the spring which is attached to the hind plating of the tree and then running to the under part of the cantle and working on brass plates or steel fastened to the upper part of the cantle as described in figure B. and the spring or steel bars as described in figure A. and having the advantages described in C.. Fig. A. Represents a top view of the tree 1&2. are the wooden bars of the tree No 3. is the cantle detached from wooden bars 1&2. 4&5. are steel bars fastened by and working on hinges to the front plating a a the steel bars then running back are attached to the cantle by several rivets b, b, Fig. B. represents a hinder view of the cantle with the operating spring No 1. being the cantle (which as before mentioned in fig. A is rivetted to the steel bars 4&5.) No 2.2, are the wooden bars. No 3, 3, the hind plating, No 4 the operating spring attached to the hind plating 3,3, by rivets a a the spring then running to the under part of the cantle and working on steel plates fastened to the under part of the cantle C, C, which spring gives the cantle & steel bars an action similar to the operation of a bellows the saddle itself being drawn over the steel bars, C. Advantages. I do hereby certify that I have made three spring saddles on the plan above delineated and from actual experiments have

9253X have ascertained that the plan is superior to any heretofore invented so far as my knowledge extends and will doubtless be of great utility to the public. Saddles made upon this plan are formed to combine the double advantage of ease both to the rider and horse. The spring gives ease to the rider however coarse or rough the gaits of the horse may be and at the same time preserves the horses back from galling or other injury David Campbell ——— Adam Hickman
Witnesses Jacob Lynch Exd
C.M.W.

(518 words)

(Patented Nov: 23. 1835.)

(Drawing)